(12) United States Patent
Okazaki et al.

(10) Patent No.: US 8,045,704 B2
(45) Date of Patent: Oct. 25, 2011

(54) ELECTRONIC APPARATUS AND JIG SYSTEM

(75) Inventors: Tetsuo Okazaki, Tokyo (JP); Manabu Yamazaki, Hino (JP); Shinichi Kido, Tokyo (JP); Kazuhiro Nakashima, Hachioji (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 376 days.

(21) Appl. No.: 12/399,616

(22) Filed: Mar. 6, 2009

(65) Prior Publication Data
US 2010/0037432 A1    Feb. 18, 2010

(30) Foreign Application Priority Data
Aug. 13, 2008    (JP) ................. P2008-208603

(51) Int. Cl.
*H04M 1/00*    (2006.01)
*H04M 9/00*    (2006.01)
(52) U.S. Cl. .................. 379/433.13; 455/575.3
(58) Field of Classification Search ............. 379/433.11, 379/433.13, 433.01; 455/575.1, 575.3, 90.3; 16/324–326
See application file for complete search history.

(56) References Cited

U.S. PATENT DOCUMENTS

| 5,661,798 | A  | * | 8/1997  | Chen ........................ 379/454 |
| 6,339,699 | B1 | * | 1/2002  | Hirai et al. ............... 455/575.1 |
| 6,481,605 | B1 | * | 11/2002 | Visenzi ..................... 224/435 |

FOREIGN PATENT DOCUMENTS
JP    2002-125022 A    4/2002
* cited by examiner

*Primary Examiner* — Tuan Nguyen
(74) *Attorney, Agent, or Firm* — Maschoff Gilmore & Israelsen

(57) ABSTRACT

According to an aspect of the invention, an electronic apparatus including: an outer case; an inner case corresponding to the outer case; an engagement nail having a first nail face directed to a first direction from the outer case toward the inner case and a second nail face directed to a second direction from the inner case toward the outer case, the engagement nail being extend from the outer case; and a resilient wire disposed on a certain position on the inner case along an edge of the inner case, the certain position corresponding to the engagement nail, wherein, at a first state, the resilient wire is movable in a third direction from the edge toward the resilient wire by the first nail face pushing the resilient wire, and wherein, at a second state, the resilient wire is movable in a fourth direction from the resilient wire toward the edge to run on the second nail face.

8 Claims, 7 Drawing Sheets

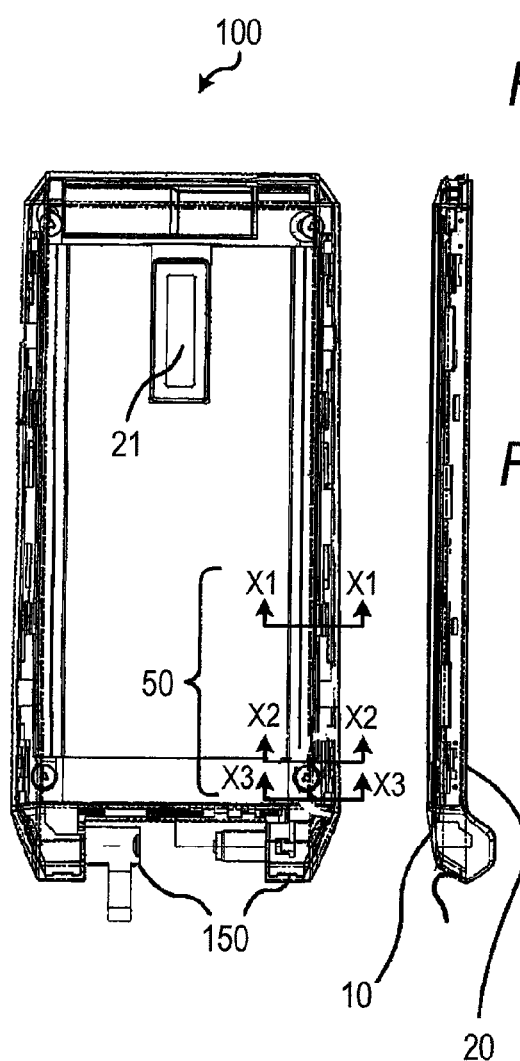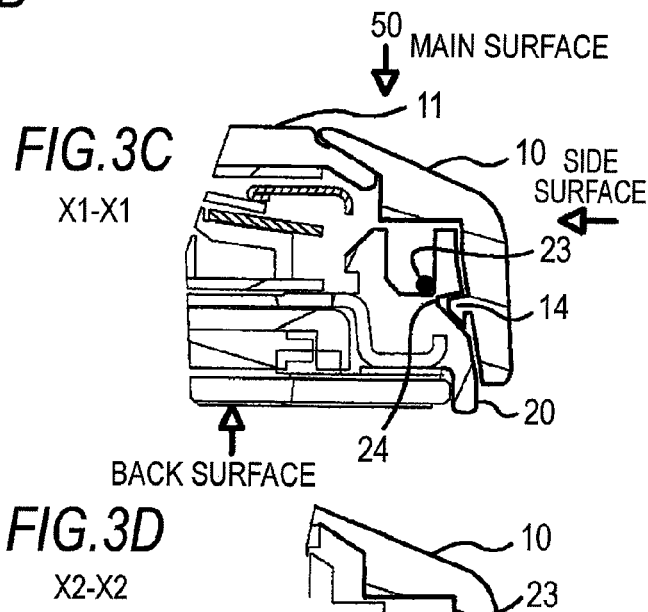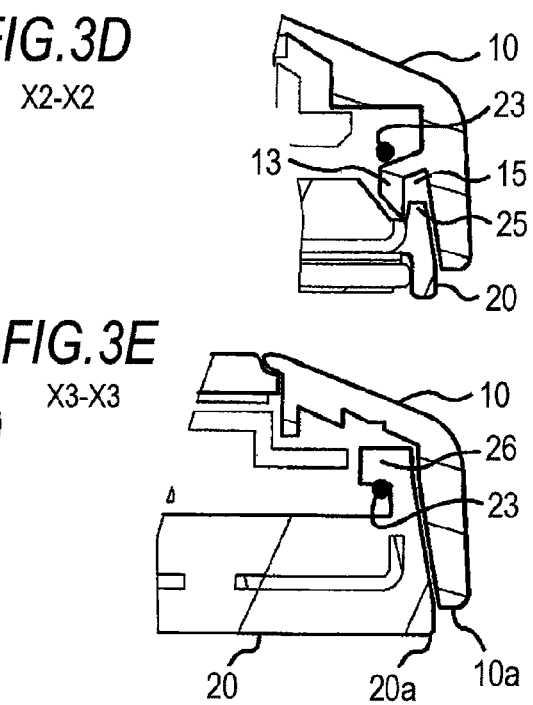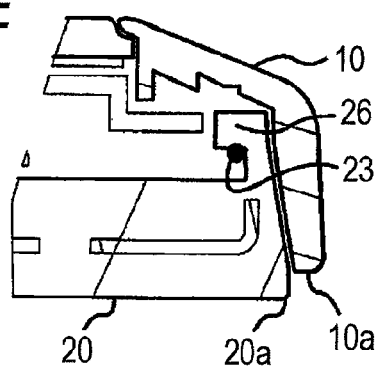

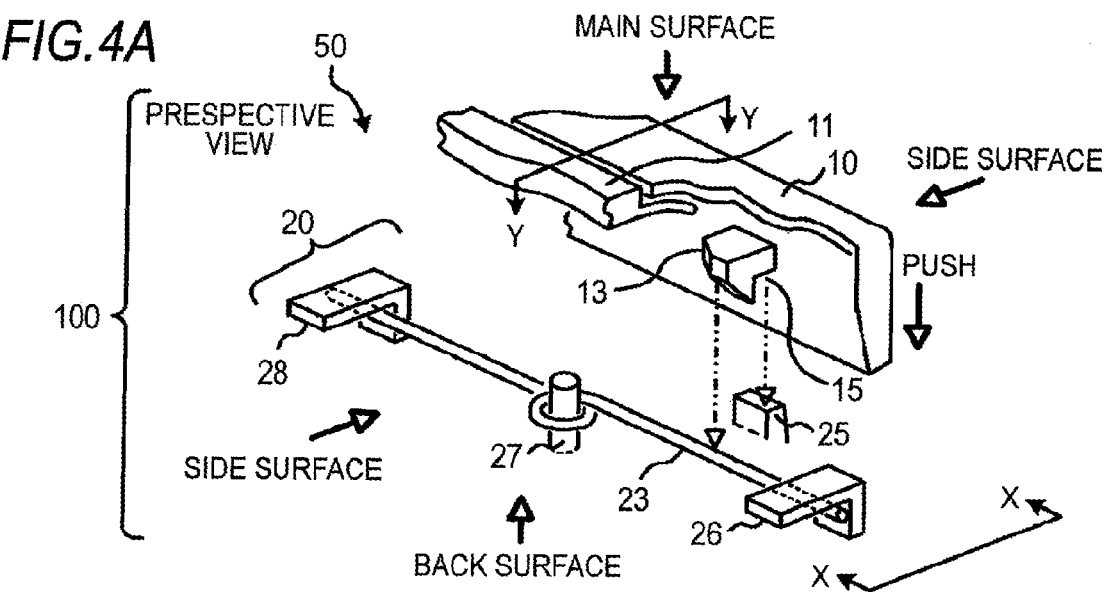
FIG.4A
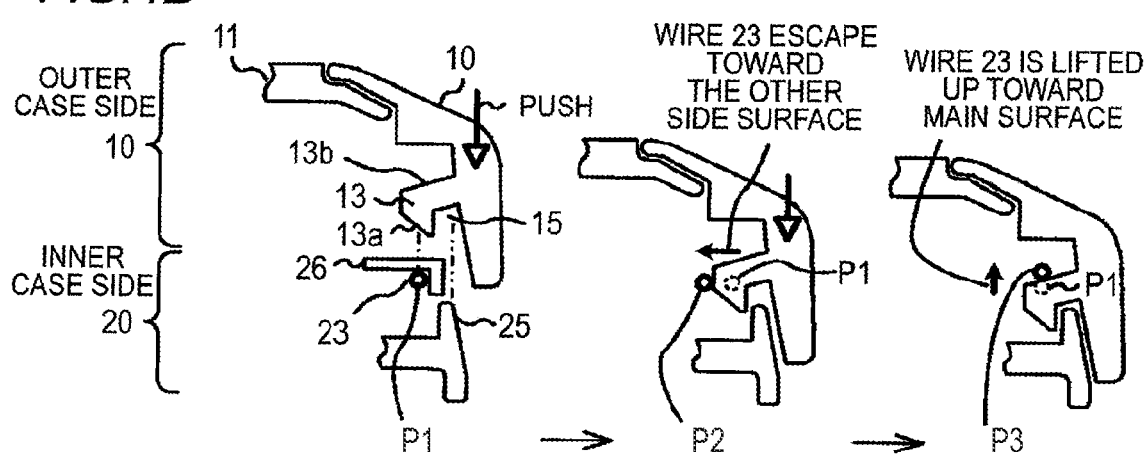
FIG.4B X-X
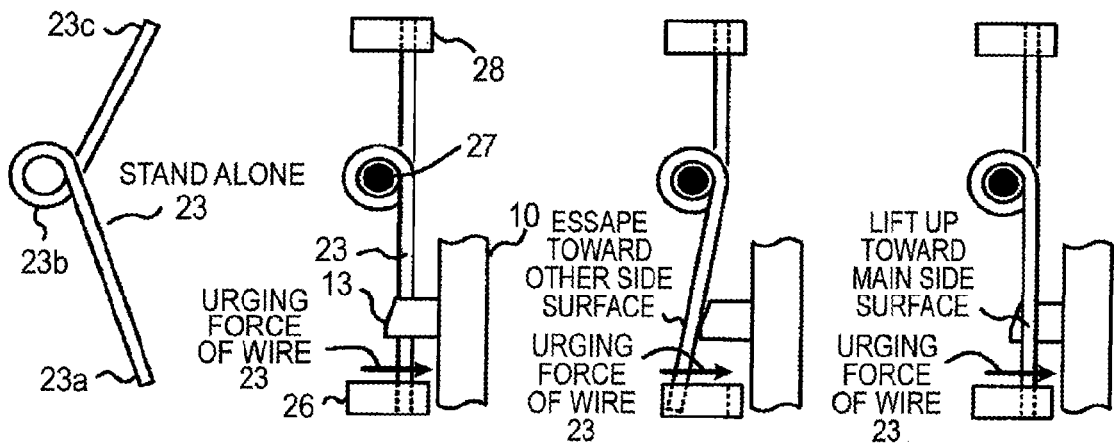
FIG.4C Y-Y

FIG.5A
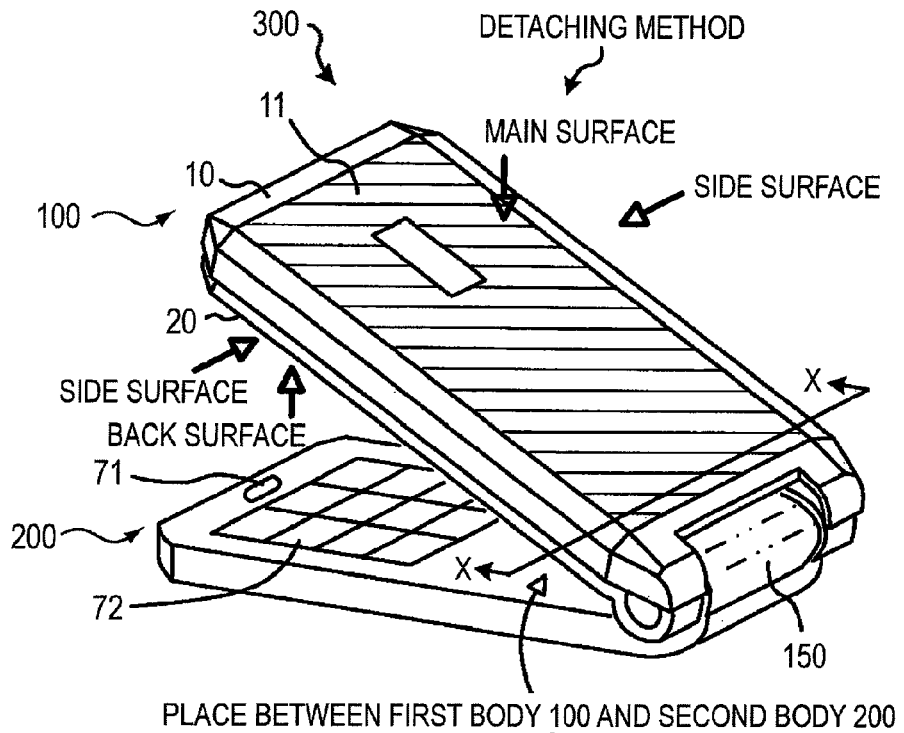
FIG.5B
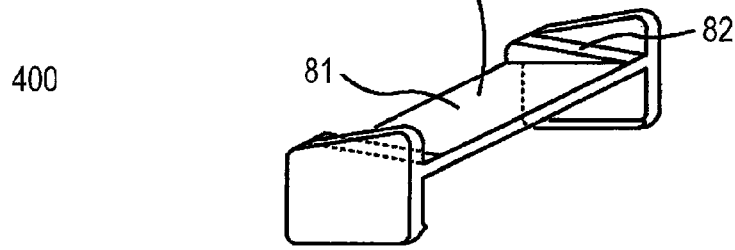
FIG.5C  X-X (JIG IS SANDWICHED):10a GO ONTO 82 AND 10 IS DETATCHED FROM INNER CASE 20
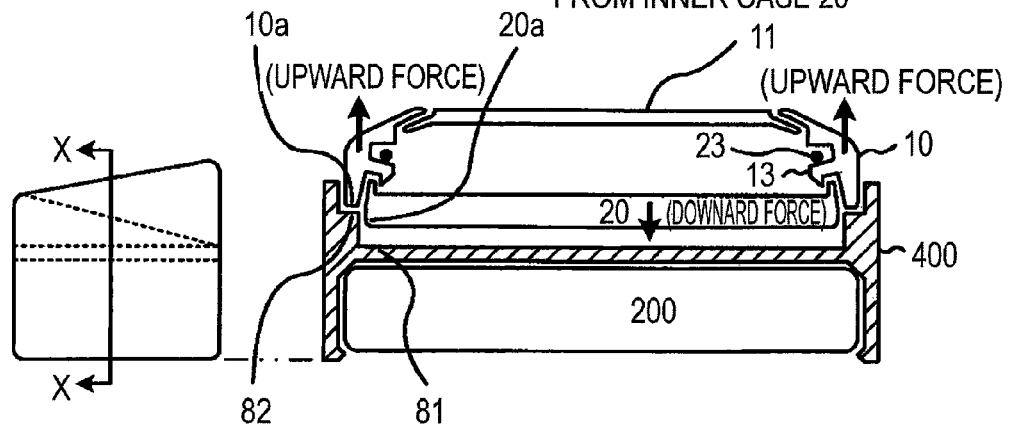

X-X

Y-Y

US 8,045,704 B2

ELECTRONIC APPARATUS AND JIG SYSTEM

CROSS-REFERENCE TO RELATED APPLICATIONS

This application is based upon and claims the benefit of priority from Japanese Patent Application No. 2008-208603, filed Aug. 13, 2008, the entire contents of which are incorporated herein by reference.

BACKGROUND

1. Field

The present invention relates to an electronic apparatus such as a cell phone and a jig system and, more particularly, to the structure of fitting portions of an outer case and an inner case of the electronic apparatus.

2. Description of the Related Art

In many cell phones, a changeable panel is attached to a cell phone main body through fitting using projections and recesses. An example of such cell phones is disclosed in JP-A-2002-125022 (paragraphs [0014] to [0037], FIGS. 1 and 5). As shown in FIGS. 1 and 5 of JP-A-2002-125022, a detachable decorative panel 14 is formed with first fitting projections 26a and 26b, second fitting projections 27a and 27b, and press-fit bosses 28a and 28b. A display main body 3 is formed with first fitting holes 19a and 19b, second fitting holes 20a and 20b, fixing holes 21a and 21b, and press-fit bushings 22a and 22b.

To attach the decorative panel 14, first, the user inserts the first fitting projections 26a and 26b into the first fitting holes 19a and 19b perpendicularly. Then, the user fits the nail-shaped second fitting projections 27a and 27b into the second fitting holes 20a and 20b in such a manner that a central portion of the decorative panel 14 is bent while the decorative panel 14 is rotated with the above first fitting portions as supporting points. Finally, the user press-fits the press-fit bosses 28a and 28b into the press-fit bushings 22a and 22b. To detach the decorative panel 14, an opposite procedure is followed.

In the cell phone of JP-A-2002-125022, the second fitting projections 27a and 27b are fitted into the second fitting holes 20a and 20b in such a manner that a central portion of the decorative panel 14 is bent. However, depending on how the user bends the decorative panel 14, the second fitting projections 27a and 27b may rub against the second fitting holes 20a and 20b. Since the portions around the second fitting projections 27a and 27b and the second fitting holes 20a and 20b are made of resin, these portions wear as the decorative panel 14 is attached and detached repeatedly. This may result in a disadvantage that reliable fitting will not be secured.

SUMMARY OF THE INVENTION

According to an aspect of the present invention, there is provided an electronic apparatus including: an outer case; an inner case corresponding to the outer case; an engagement nail having a first nail face directed to a first direction from the outer case toward the inner case and a second nail face directed to a second direction from the inner case toward the outer case, the engagement nail being extend from the outer case; and a resilient wire disposed on a certain position on the inner case along an edge of the inner case, the certain position corresponding to the engagement nail, wherein, at a first state, the resilient wire is movable in a third direction from the edge toward the resilient wire by the first nail face pushing the resilient wire, and wherein, at a second state, the resilient wire is movable in a fourth direction from the resilient wire toward the edge to run on the second nail face.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 3A to 3E show the structure of the first body 100 according to the first embodiment.

FIGS. 4A to 4C show the structure of one fitting portion 50 according to the first embodiment.

FIGS. 5A to 5C illustrate a detaching system according to the first embodiment of.

DETAILED DESCRIPTION

Embodiments of the present invention will be described below.

Embodiment 1

Figure 1:
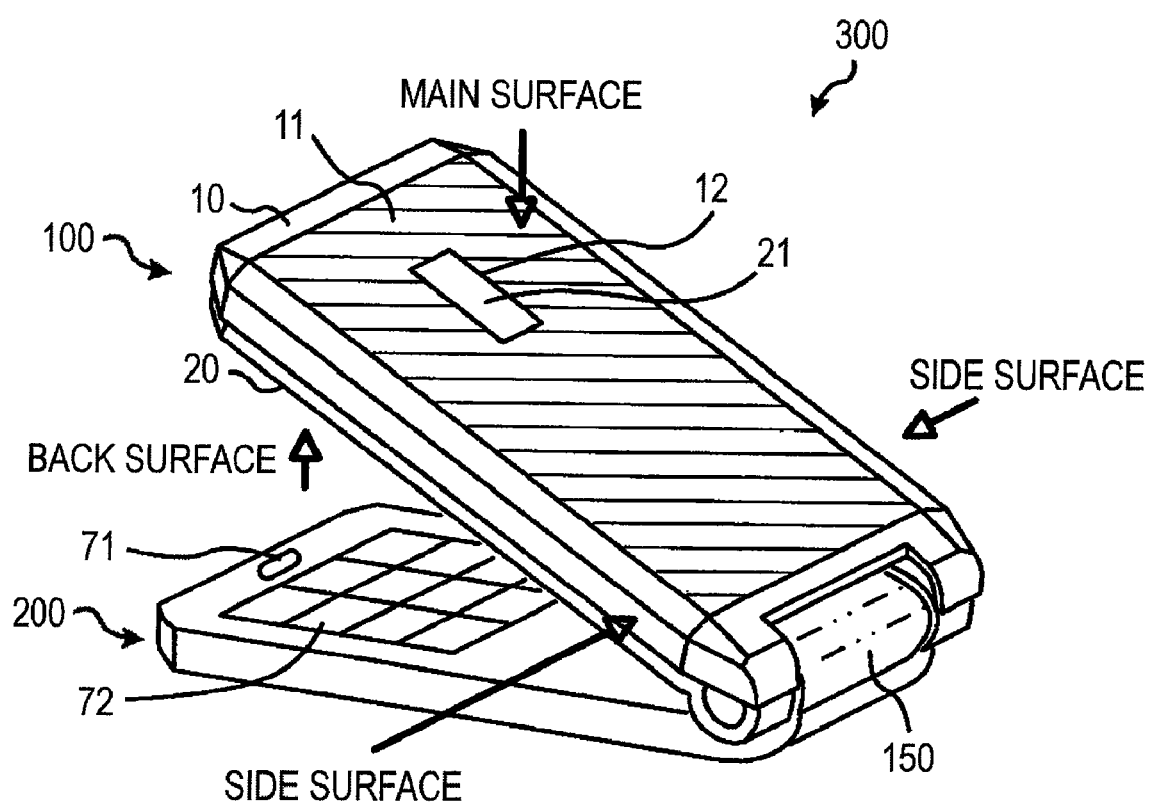
FIG. 1 is a perspective view showing an appearance of a cell phone 300 according to a first embodiment.

FIG. 1 is a perspective view showing an appearance of a cell phone 300 (electronic apparatus) according to a first embodiment of the invention. The cell phone 300 has a structure that a first body 100 and a second body 200 are connected to each other by a hinge 150 so as to be opened and closed. The first body 100 is a body in which an earpiece and a main display unit (neither shown) are provided on a surface that is opposed to the second case 200 in a closed state. The second case 200 is a body in which a mouthpiece 71, a ten-key unit 72, etc. are provided on a surface that is opposed to the above-mentioned surface of the first body 100.

The first body 100 also has an outer case 10, a changeable panel 11 (hatched in FIG. 1), and an inner case 20. The inner case 20, which is a case as a base of the first body 100, is fixed to the hinge 150 and mounted with various components.

The outer case 10 is attached to the inner case 20 in such a state that the changeable panel 11 is partially located inside the outer case 10. The user can switch the changeable panel 11 in a desired manner by detaching the outer case 10 from the inner case 20 and then attaching the former to the latter. A detailed attaching operation will be described later with reference to FIG. 2 and following figures.

The changeable panel 11 has a sub-display window 12 through which a sub-display unit 12 mounted on the inner case 20 is seen.

A changeable-panel-11-side surface (i.e., outer-case-10-side surface), an inner-case-20-side surface, and two side surfaces of the first body 100 will be called a main surface, a back surface, and side surfaces, respectively. In the following, members of the outer case 10 will be given reference symbols that are in the tens and members of the inner case 20 will be given reference symbols that are in the twenties.

Figure 2:
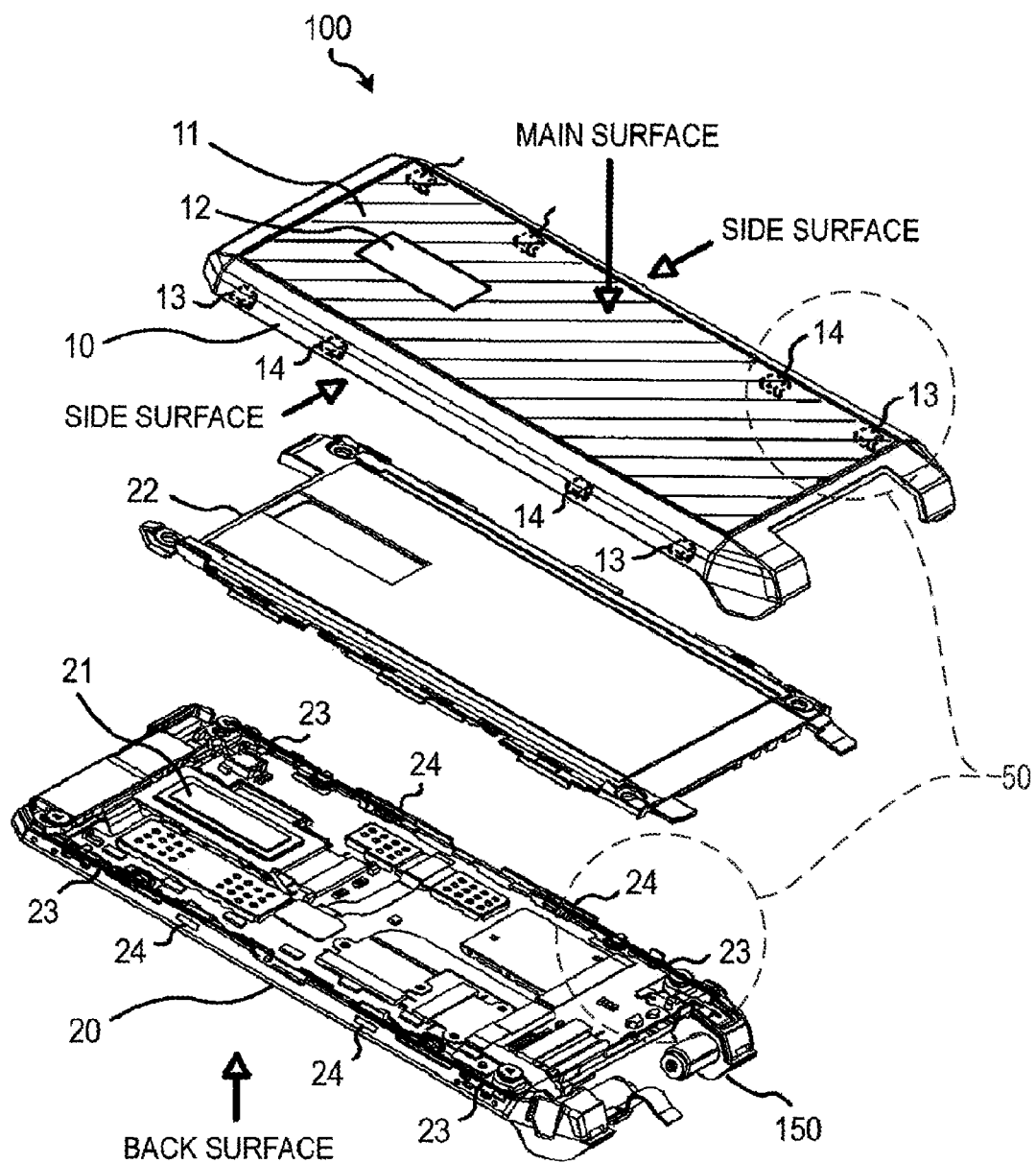
FIG. 2 is an exploded perspective view of a first body 100 according to the first embodiment.

FIG. 2 is an exploded perspective view of the first body 100 according to the first embodiment of the invention. The first case 100 is composed of the outer case 10, the changeable panel 11, the inner case 20, a blind panel 22, etc.

The blind panel 22 is attached to the inner case 20 to blind the various components on the inner case 20 when the outer case 10 is disengaged from the inner case 20.

Next, a description will be made of fitting portions 50 (one fitting portion is indicated by broken-line circles in FIG. 2) which serve to attach the outer case 10 to the inner case 20. The outer case 10 is provided with four sets of a wire-engagement nail 13 and a projection 14 adjacent to the side surfaces (one set is indicated by a broken-line circle).

The inner case 20 is provided with four sets of a resilient wire 23 and a recess 24 (one set is indicated by a broken-line circle). Wires 23 are located at such positions as to be opposed to the respective wire-engagement nails 13 in the direction from the main surface to the back surface, and the recesses 24 are located at such positions as to be opposed to the respective projections 14 in the same direction. Each wire 23 extends parallel with the longitudinal direction of the associated side surface.

When the outer case 10 is pushed toward the inner case 20, the wires 23 are engaged with the respective wire-engagement nails 13 and the projections 14 are fitted into the respective recesses 24. The invention is characterized by engagement portions each having a wire-engagement nail 13 and a wire 23, which will be described below in more detail.

FIGS. 3A to 3E show the structure of the first body 100 according to the first embodiment of the invention. FIG. 3A shows the main surface and FIG. 3B shows one side surface. FIGS. 3C, 3D, and 3E are sectional views taken along lines X1-X1, X2-X2, and X3-X3, respectively, in one fitting portion 50 of FIG. 3A. The outer case 10 is attached to the inner case 20 so as to cover the latter from outside.

As shown in FIG. 3C which is the X1-X1 cross section, the projection 14 is fitted in the recess 24.

As shown in FIG. 3D which is the X2-X2 cross section, the wire-engagement nail 13 is engaged with the wire 23 in such a manner that the wire 23 is pressed against the main-surface-side surface of the wire-engagement nail 13 (i.e., toward the back surface side). The outer case 10 is formed with a guide recess 15 between the side wall and the wire-engagement nail 13. The inner case 20 is formed with a guide projection 25 at such a position that it is opposed to the guide recess 15. The guide projection 25 is thus fitted in the guide recess 15.

As shown in FIG. 3) which is the X3-X3 cross section, the inner case 20 is provided with a stopper 26 on which one end portion of the wire 23 is locked by the urging force of the wire 23 so that the wire is not moved toward the main surface side or the back surface side. The end portion of the wire 23 can be moved toward the other side surface.

Since the outer case 10 is configured in such a manner as to cover the inner cover 20 from outside, an outer case side wall end portion 10a of the outer case 10 is located outside an inner case side wall end portion 20a of the inner case 20. To detach the outer case 10 from the inner case 20, the outer case side wall end portion 10a is lifted up toward the main surface side with a jig. The details of this operation will be described later with reference to FIG. 5.

Next, action of the engagement portion having the wire-engagement nail 13 and the wire 23 of each fitting portion 50 will be described in detail.

FIGS. 4A to 4C show the structure of one fitting portion 50 according to the first embodiment of the invention in which the wire-engagement nail 13, the wire 23, and related members are shown mainly. FIG. 4A is a perspective view. FIG. 4B is a sectional view taken along line X-X in FIG. 4A and corresponds to FIG. 3D (X2-X2 cross section). FIG. 4C is a sectional view taken along line Y-Y in FIG. 4A.

The outer case 10 is formed with the wire-engagement nail 13 and the guide recess 15. The inner case 20 is provided with the wire 23 and the guide projection 25 which are located at such positions as to be opposed to the wire-engagement nail 13 and the guide recess 15, respectively. The inner case 20 is also provided with stoppers 26, 27, and 28 on which the wire 23 is locked. The stopper 27 has a cylindrical shape. Each of the stoppers 26 and 28 has walls on the side surface side and the main surface side.

The wire 23 is a resilient wire such as a piano wire or a stainless steel (SUS) wire and has a central loop portion 23b as shown in the leftmost view (stand-along state) of FIG. 4C. In the stand-alone state, end portions 23a and 23c of the wire 23 are free and the wire 23 forms an obtuse angle. The cylindrical stopper 27 is inserted into the loop portion 23b and the end portions 23a and 23c are pressed against and locked on the respective stoppers 26 and 28.

Therefore, the end portion 23a of the wire 23 always exerts rightward urging force as indicated by arrows in FIG. 4C (i.e., toward the associated side surface). The end portion 23a is free leftward in FIGS. 4B and 4C (i.e., toward the other side surface) because no stopper wall exists on the left of the end portion 23a, though this movement is against the urging force.

The wire-engagement nail 13 has a back-surface-side, slant hitting portion 13a to hit the wire 23 and a main-surface-side lock portion 13b.

Next, a procedure for attaching the outer case 10 to the inner case 20 will be described. According to this procedure, as shown in FIGS. 4B and 4C, the wire 23 is moved from an initial position P1 to an engagement position P3 past an intermediate position P2.

The initial position P1 corresponds to a state that the user has put the outer case 10 on the inner case 20. In this state, the hitting portion 13a and the wire 23 are opposed to each other in the vertical direction. The guide recess 15 and the guide projection 25 are also opposed to each other in the vertical direction. The end portions 23a and 23c of the wire 23 are locked on the respective stoppers 26 and 28, which is an initial state before attachment.

Then, the user pushes the outer case 10 toward the inner case 20, whereby the hitting portion 13a hits the wire 23 and the wire 23 is pushed leftward (i.e., in the direction from the associated side surface to the other side surface) from the initial position P1 to the intermediate position P2 (shown in FIGS. 4B and 4C) along the hitting portion 13a against the urging force.

The user further pushes the outer case 10 toward the inner case 20, whereby the outer case 10 is somewhat bent so as to be located somewhat on the back-surface side of its position shown in the rightmost view of FIG. 4B in which the wire 23 is located at the engagement position P3. The wire 23 goes onto the lock portion 13b because of the rightward urging force of its own (acting toward the associated side surface). If the user releases the outer case 10 in this state, the outer case 10 returns upward from the state that is somewhat bent downward and the wire 23 is lifted up to the final position (engagement position) P3 (see FIGS. 4B and C) which is located above the initial position P1. The attaching operation is thus completed.

Since at the engagement (final) position P3 the wire 23 is located above (i.e., on the main-surface side of) the initial position P1, the outer case 10 is urged downward by the downward urging force (acting toward the back surface side)

and no play is caused. Always exerting the rightward urging force (acting toward the associated side surface), the wire 23 exerts force of pushing the wire-engagement nail 13 and the outer case 10 rightward (toward the associated side surface). However, since the guide projection 25 is fitted in the guide recess 15, the wire-engagement nail 13 and the outer case 10 do not project rightward.

As described above, the end portion 23a of the wire 23 can move freely with the stopper 27 as a supporting point. Furthermore, having a circular cross section, the wire 23 is moved relatively freely when the wire-engagement nail 13 hits the wire 23. Therefore, the wire 23 can be engaged with the wire-engagement nail 13 without damaging it.

Next, a detaching method will be described.

FIGS. 5A to 5C illustrate a detaching system according to the first embodiment of the invention. FIG. 5A shows an appearance of the cell phone 300, FIG. 5B shows an appearance of a panel switching jig 400, and FIG. 5C is a sectional view, taken along line X-X in FIG. 5A, of the cell phone 300 as mounted with the panel switching jig 400.

The cell phone 300 shown in FIG. 5A is the same as shown in FIG. 1 and hence will not be described here.

The panel switching jig 400 shown in FIG. 5B is provided as an accessory of the cell phone 300. The panel switching jig 400 generally assumes an H shape in the X-X cross section and has a first step portion 81 as a central member. Second step portions 82 located at both ends are steps that rise from the first step portion 81 to the main-surface side.

As shown in FIG. 5C which shows a mounted state, the first step portion 81 has such a length as to house the inner case 20 (the width dimension between its two side surfaces) of the cell phone 300. The outer case side wall end portions 10a of the outer case 10 of the cell phone 300 are placed on the respective second step portions 82.

Next, a procedure for detaching the outer case 10 of the cell phone 300 from its inner case 20 will be described. The user puts the first step portion 81 of the panel switching jig 400 between the first body 100 and the second body 200 of the cell phone 300 in the vicinity of the hinge 150 and thereby establishes the state of FIG. 5C.

Then, the user holds end portions, opposite to the hinge 150, of the first body 100 and the second body 200 and applies force in such a direction as to fold the cell phone 300. As a result, whereas the inner case 20 receives downward force because it is fixed to the hinge 150, the outer case 20 receives upward force because the outer case side wall end portions 10a of the outer case 10 are placed on the respective second step portions 82. That is, the forces for separating the outer case 10 and the inner case 20 from each other act thereon. As a result, the wires 23 are moved laterally and disengaged from the respective wire-engagement nails 13 and the outer case 10 is detached from the inner case 20.

Then, the user removes the changeable panel 11 (partially located inside the outer case 10) from the outer case 10, replaces it with a new changeable panel 11, and attaches the outer case 10 to the inner case 20 again.

In the first embodiment of the invention, the resilient wire is used in one part of each fitting portion. By virtue of the urging force of the wire, a high degree of freedom of its movement, and its cylindrical structure, the wire can smoothly be engaged with the resin wire-engagement nail. This prevents the engagement portions, in particular, the resin nails, from being degraded as engagement and disengagement are done repeatedly.

Embodiment 2

Figure 6:
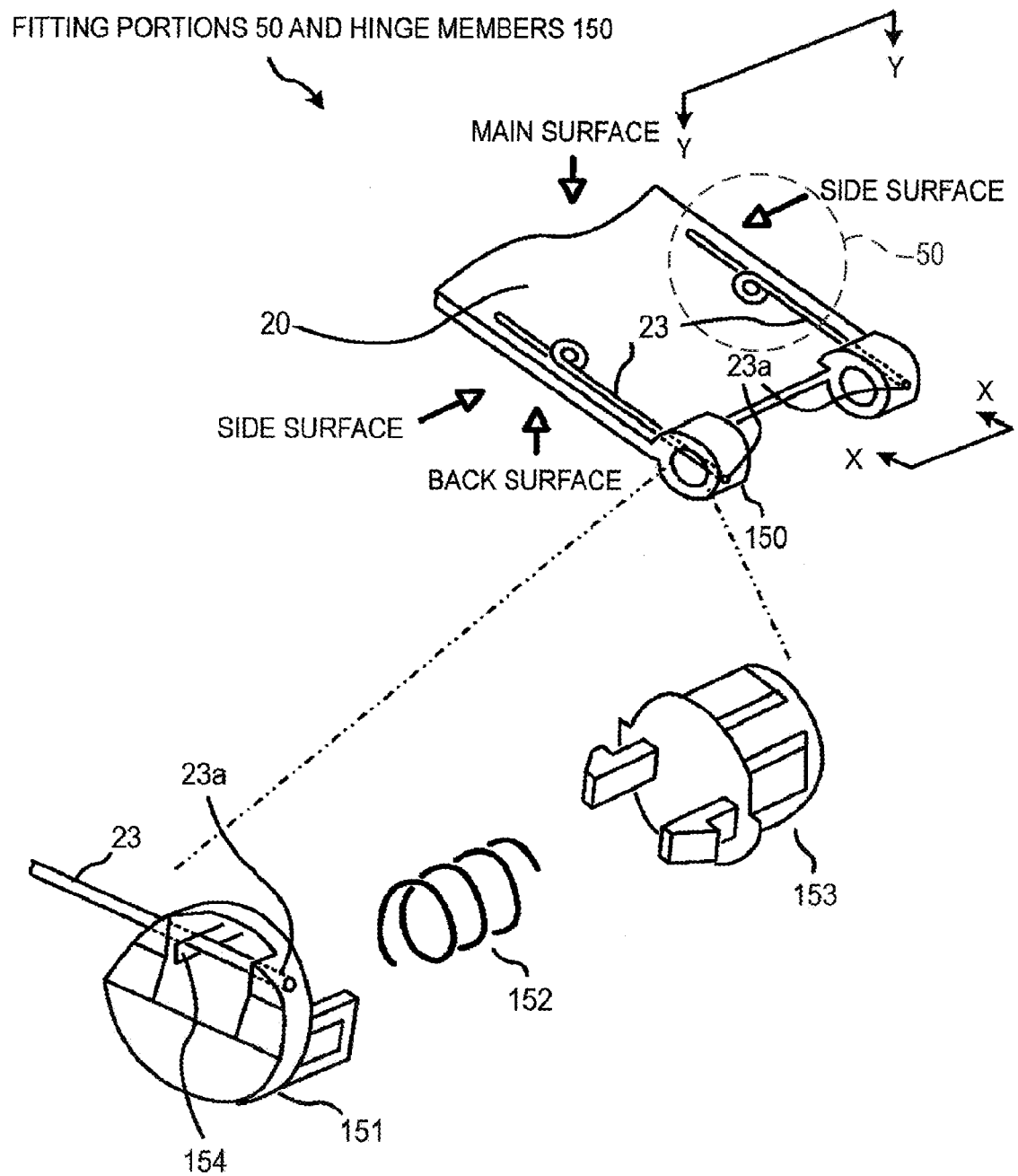
FIG. 6 is a perspective view showing the structure of fitting portions 50 and hinge members 150 according to a second embodiment.

FIG. 6 is a perspective view showing the structure of fitting portions 50 and hinge members 150 according to a second embodiment of the invention. The second embodiment is different from the first embodiment in that each hinge member 150 of the cell phone 300 is provided with a detaching structure and a detaching operation is performed without using a jig.

The outer-case-10-side members of each fitting portion 50 are the same as in the first embodiment and hence will not be illustrated or described. As for the members on the inner case 20 side, an end portion 23a of each wire 23 extends to inside the associated hinge member 150.

Each hinge member 150 has, inside, a hinge cap 151, a folding spring 152, and a hinge sleeve 153 at the outside end in the hinge axial direction. FIG. 6 shows only one hinge member 150. The hinge cap 151 is formed with a hole 154 which serves to house and lock the end portion 23 of the associated wire 23.

The hinge caps 151 originally serve to unfold the folding-type cell phone 300. When the user pushes the hinge caps 151 (which are located at both ends of the hinge member 150) toward the center along the axis of the hinge member 150, the cell phone 300 is unfolded.

Next, a detaching operation will be described.

Figure 7A:
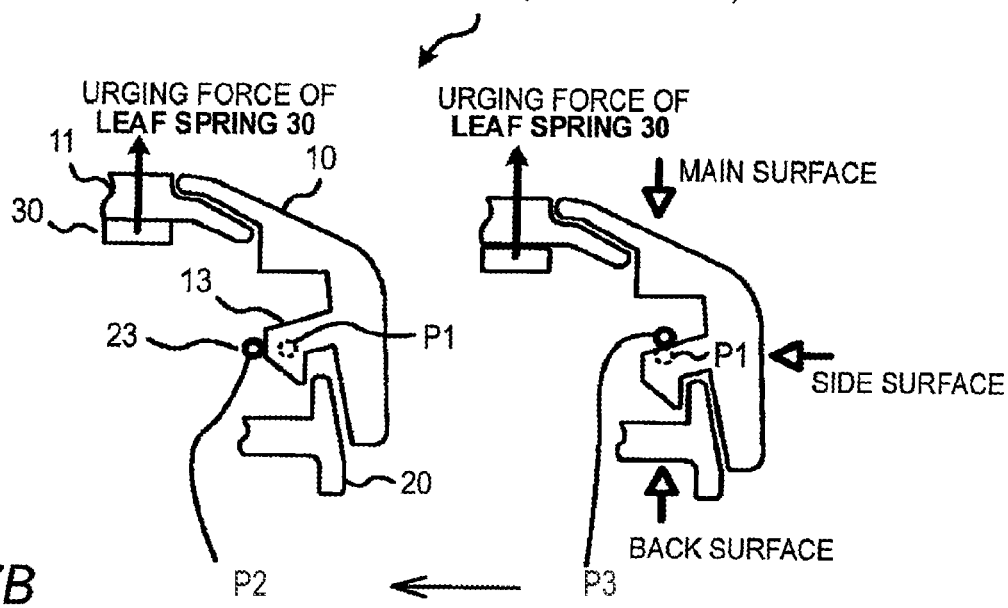
FIGS. 7A and 7B illustrate a detaching operation according to the second embodiment.
Figure 7B:
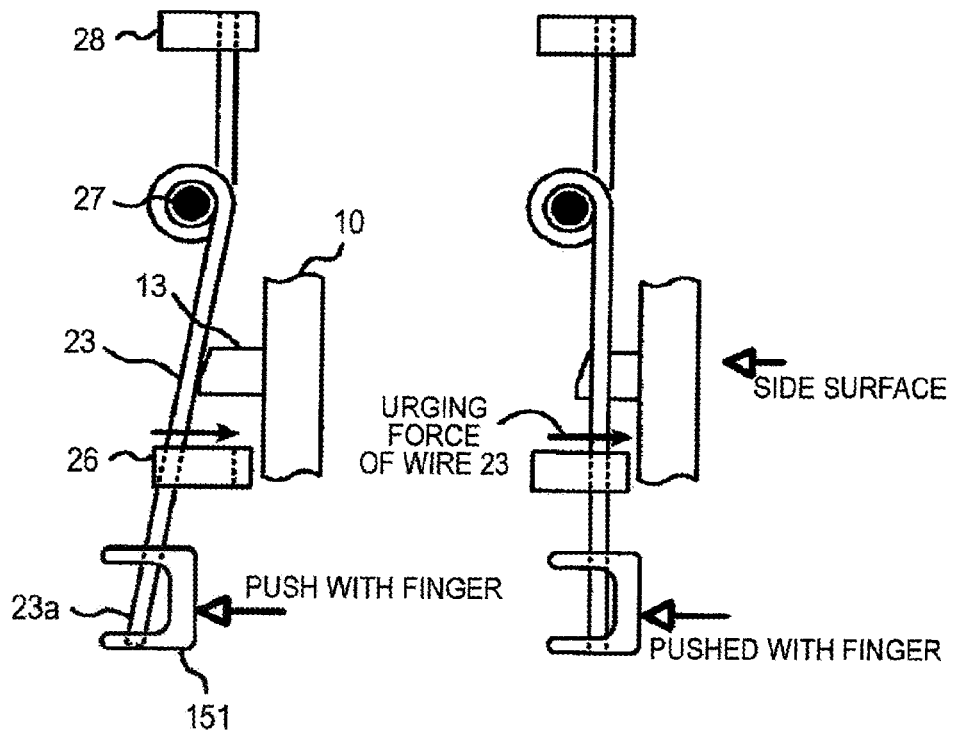

FIGS. 7A and 7B illustrate a detaching operation according to the second embodiment of the invention. FIG. 7A is a sectional view taken along line X-X in FIG. 6 and FIG. 7B is a sectional view taken along line Y-Y in FIG. 6.

As shown in FIG. 7A which is the X-X cross section, a newly provided leaf spring 30 is fixed in such a manner as to be sandwiched between the outer case 10 and the inner case 20 and exerts urging force for separating the outer case 10 from the inner case 20.

In a state that the wire 23 is located at an engagement position P3 (see FIGS. 7A and 7B), the outer case 10 is attached to the inner case 20. When in this state the user pushes the hinge caps 151 inward along the axis of the hinge 150, the end portion 23a of the wire 23 is pushed in the direction from the associated side surface to the other side surface and reaches an intermediate position P2 (see FIGS. 7A and 7B). In this state, the end portion 23a of the wire 23 has been pushed leftward and is disengaged from the wire-engagement nail 13. As a result, the outer case 10 is separated from the inner case 20 and lifted up by the urging forces of the leaf springs 30.

Then, the user removes the changeable panel 11 (partially located inside the outer case 10) from the outer case 10, replaces it with a new changeable panel 11, and attaches the outer case 10 to the inner case 20 again.

The second embodiment of the invention provides, in addition to the advantages of the first embodiment, an advantage that it is not necessary to provide a detaching jig.

The body according to the invention can be applied to cell phones, PHS phones, data terminals, etc.

As described with reference to the embodiment, there is provided an electronic apparatus in which an outer case can be attached to an inner case reliably, a changeable panel can be switched easily, and fitting portions are high in durability, as well as a jig system for it.

The above embodiment can provide an electronic apparatus in which an outer case can be attached to an inner case reliably, a changeable panel can be switched easily, and fitting portions are high in durability, as well as a jig system for it.

What is claimed is:

1. An electronic apparatus comprising:
   an outer case;
   an inner case corresponding to the outer case;
   an engagement nail having a first nail face directed to a first direction from the outer case toward the inner case and a second nail face directed to a second direction from the inner case toward the outer case, the engagement nail being extend from the outer case; and a resilient wire disposed on a certain position on the inner case along an edge of the inner case, the certain position corresponding to the engagement nail, wherein, at a first state, the resilient wire is movable in a third direction from the edge toward the resilient wire by the first nail face pushing the resilient wire, and wherein, at a second state, the resilient wire is movable in a fourth direction from the resilient wire toward the edge to run on the second nail face.

2. The electronic apparatus according to claim 1, wherein, at a first state, the resident wire is movable in a second direction to urge the engagement nail in the first direction.

3. The electronic apparatus according to claim 1, wherein the outer case has a concave portion between the engagement nail and a given edge corresponding to the edge of the inner case;

wherein the inner case has a convex portion configured to fit the concave portion at the second state.

4. The electronic apparatus according to claim 1, wherein the wire has a loop portion approximately at the center of the wire in a longitudinal direction of the wire;

wherein the inner case has a lock portion on which the loop portion is locked;

wherein the engagement nail is configured to be engaged with an end portion of the wire.

5. The electronic apparatus according to claim 4, wherein the end portion urges the engagement nail in the first direction at the second state.

6. A system for replacement of a changeable panel, the system comprising:

an electronic apparatus having:

a second body;

a first body jointed with the second body by a hinge to be foldable, the first body having:

an inner case opposed to the second body when the apparatus is folded;

an outer case attached to the inner case so as to cover the inner case, the outer case having two side wall end portions located outside of two respective side surface of the inner case; and the changeable panel held by the outer case and the inner case therebetween;

a panel switching jig formed in an H-shape in cross section, the jig having:

a first step portion that is wide enough to house the inner case; and second step portions provided at both ends of the first step portion, wherein, when the electronic apparatus is folded with the first step portion of the panel switching jig set on a certain place between the first body and the second body in the vicinity of the hinge, the two side wall end portions go onto the respective second step portions and the outer case is detached from the inner case.

7. An electronic apparatus comprising:

an outer case;

an inner case corresponding to the outer case;

a hinge member fixed to an inner case and having a hole and a hinge cap;

an engagement nail having a first nail face directed to a first direction from the inner case toward the outer case; and a resilient wire disposed on a certain position on the inner case along an edge of the inner case, the certain position corresponding to the engagement nail, one end of the resilient wire extending to the hinge member and held by the hole, wherein, when the outer case fits the inner case, the resident wire run on the first nail face, wherein, when the hinge cap is pushed inward along an axis of the hinge, the wire being in engagement with the engagement nail escapes in a second direction away from the edge of the inner case and the outer case is detached from the inner case.

8. The electronic apparatus according to claim 7 further comprising a release spring disposed between the inner case and the outer case, wherein the inner case and the outer case are separated from each other by an urging force of the release spring when the outer case is detached from the inner case.

* * * * *